(12) United States Patent
Connell et al.

(10) Patent No.: US 7,069,711 B1
(45) Date of Patent: Jul. 4, 2006

(54) BRUSH ATTACHMENT FOR GOLF COURSE GREENS MOWER

(75) Inventors: Jeffrey S. Connell, Blythewood, SC (US); Lawrence E. Thompson, Franklin, IN (US)

(73) Assignee: TG Group, LLC, Franklin, IN (US)

( * ) Notice: Subject to any disclaimer, the term of this patent is extended or adjusted under 35 U.S.C. 154(b) by 0 days.

(21) Appl. No.: 11/095,873

(22) Filed: Mar. 31, 2005

(51) Int. Cl.
*A01D 34/53* (2006.01)
(52) U.S. Cl. .......................... 56/249; 56/16.7
(58) Field of Classification Search ................ D15/27, D15/28; 56/249, 7, 16.7, 16.9
See application file for complete search history.

(56) References Cited

U.S. PATENT DOCUMENTS

| | | | |
|---|---|---|---|
| 1,168,713 A | 1/1916 | Cummins | |
| 1,421,060 A | 6/1922 | Brook | |
| 1,566,194 A | 12/1925 | Freeman | |
| 1,674,303 A | 6/1928 | Sanford | |
| 1,674,306 A | 6/1928 | Shaw | |
| 1,757,844 A * | 5/1930 | Pol | 56/249 |
| 1,801,016 A | 4/1931 | MacGregor | |
| 2,209,309 A * | 7/1940 | George | 56/16.9 |
| 2,268,250 A * | 12/1941 | Gormley et al. | 56/400.14 |
| 2,300,192 A | 10/1942 | Allen | |
| 2,474,418 A | 6/1949 | Graves | |
| 2,973,535 A | 3/1961 | Olay | |
| 3,205,643 A * | 9/1965 | Dunham | 56/314 |
| 3,525,201 A | 8/1970 | Kaufman | |
| 3,845,796 A * | 11/1974 | Moore | 144/1.1 |
| 4,021,996 A * | 5/1977 | Bartlett et al. | 56/7 |
| 4,306,406 A * | 12/1981 | Fulkerson et al. | 56/13.5 |
| 4,747,174 A | 5/1988 | Hightower | |
| 4,989,676 A | 2/1991 | Rogers | |
| 5,228,277 A * | 7/1993 | Smith et al. | 56/16.9 |

\* cited by examiner

*Primary Examiner*—Árpád Fábián Kovács
(74) *Attorney, Agent, or Firm*—Michael A. Mann; Nexsen, Pruet, LLC

(57) ABSTRACT

A brush attachment for a golf course greens mower includes a frame that supports a golf greens brush on the distal end and is pivotally attached to the same axle as the cutter heads and grass clippings buckets so that the brush is lifted with them. In addition, it has a lifting latch that allows the brush to be secured in an elevated position when the mower is stored and the cutter head is not elevated.

15 Claims, 9 Drawing Sheets

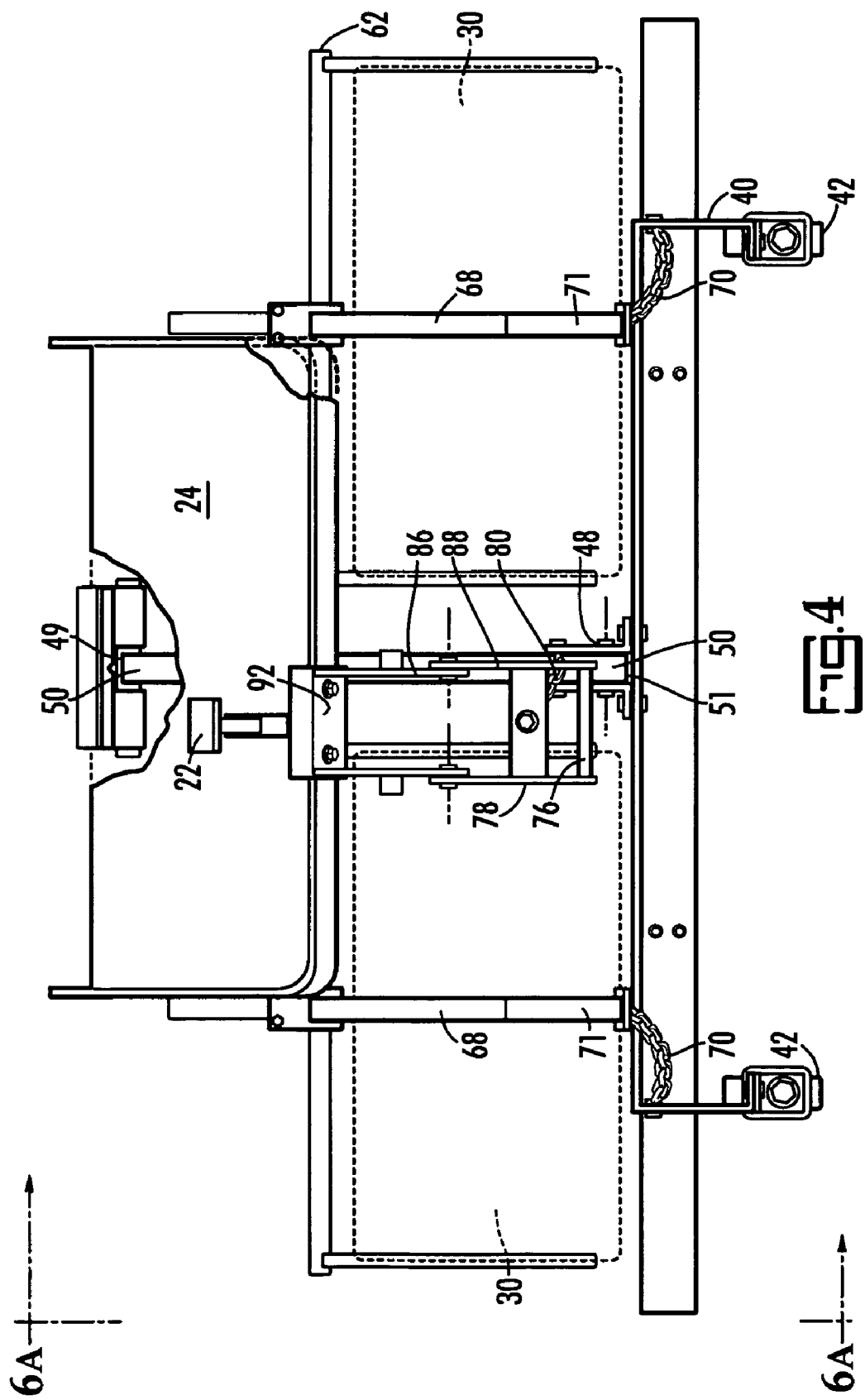

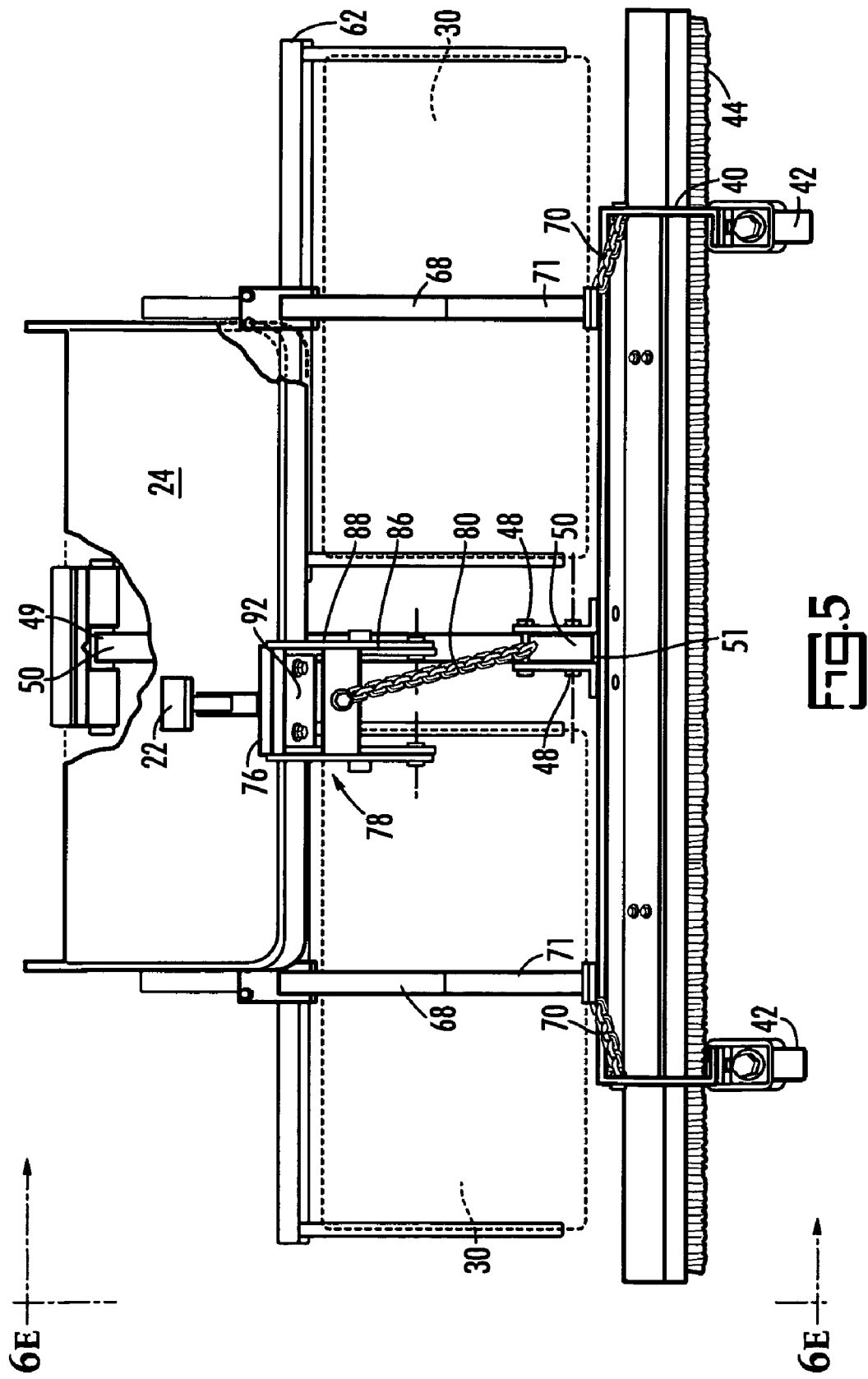

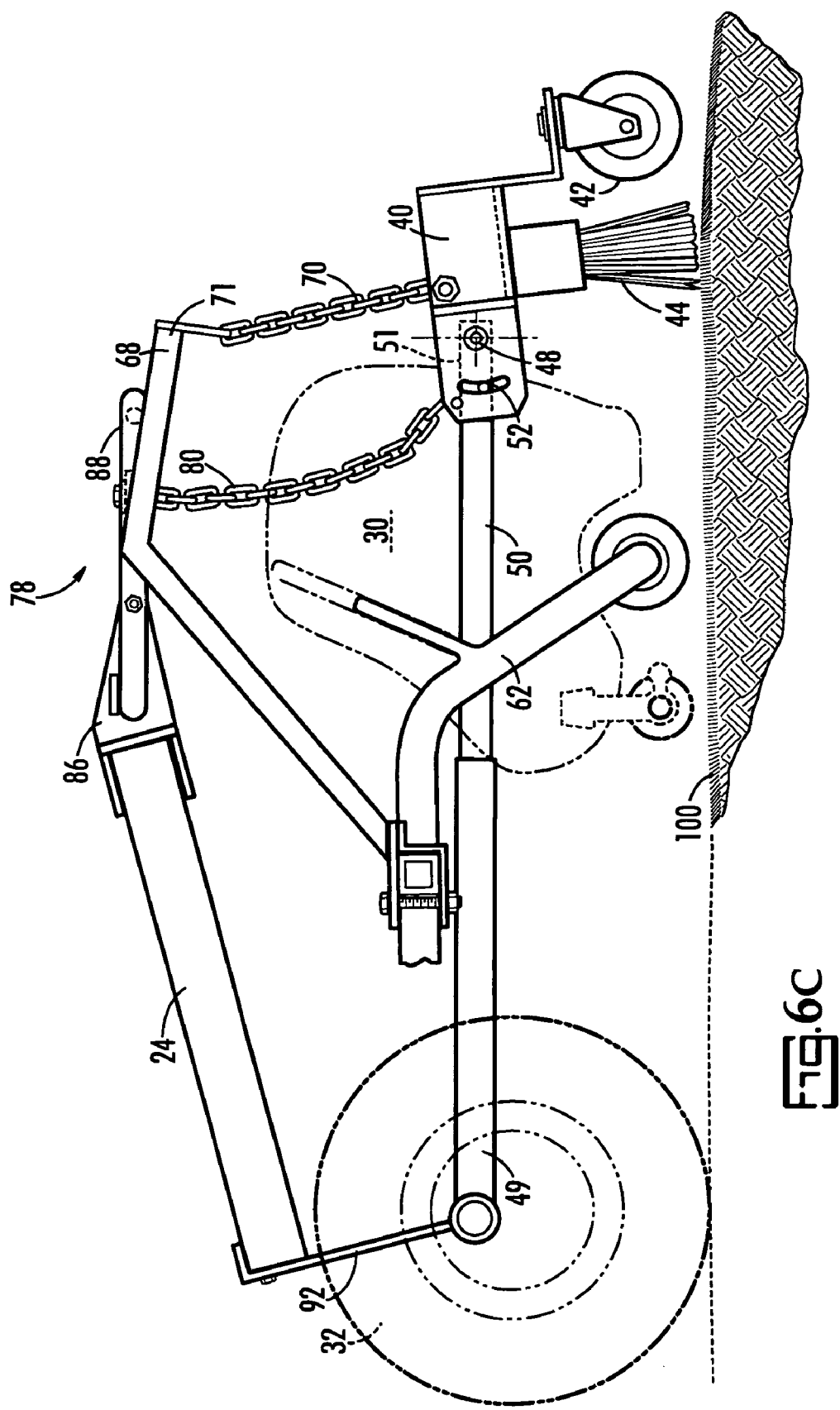

US 7,069,711 B1

BRUSH ATTACHMENT FOR GOLF COURSE GREENS MOWER

CROSS REFERENCE TO RELATED PATENTS

Not Applicable

BACKGROUND OF THE INVENTION

The present invention relates to lawn mowers, and to golf course greens mowers in particular.

Perhaps no grass is more carefully cared for or so closely cut and groomed as the grass on a golf course green. In fact, the amount of labor involved in cutting and grooming golf course greens is considerable. In addition to cutting the grass and collecting the grass clippings, some grasses, particularly Bermuda grasses, such as those that are used in greens in golf courses located in areas of the country that have warmer weather, need to be brushed to keep them from developing a grain.

Brushes for golf course greens are not new but have been around for many years. See for example the brushes of Cummins in U.S. Pat. No. 1,168,713; that of Brook in U.S. Pat. No. 1,421,060; the golf course brush of MacGregor in U.S. Pat. No. 1,801,016; and the green sweeper of Shaw in U.S. Pat. No. 1,674,306. Somewhat more recently, brushes have been attached to riding greens mowers, as taught by Kaufman in U.S. Pat. No. 3,525,201 and by Rogers in U.S. Pat. No. 4,989,676. These mowers lift the cutter heads and clippings buckets when making a turn for the next pass and must lift the brush as well.

How the brush is attached and secured to the mower can make a big difference in the operation of the greens mower with a brush attachment. The movement of the cutter heads and brush need to be coordinated so that both can be lifted together when making a turn at the end of a pass over the green. The attachment should be secure and adjustable so that the greens keeper can assure that the pressure on the grass is suitable for the type of grass, the time of year and the level of moisture in the soil. Thus there remains a need for a better way to secure a greens brush to a greens mower.

SUMMARY OF THE INVENTION

According to its major aspects and briefly recited, the present invention is a brush attachment for a golf course greens mower. The attachment includes a frame that supports a golf greens brush on the distal end and is pivotally attached to the same axle as the cutter heads and grass clippings buckets so that the brush is lifted with them. In addition, it has a lifting latch that allows the brush to be secured in an elevated position when the mower is stored and the cutter head is not elevated.

A feature of the present invention is the way that the brush is attached. Because of the attachment, the movement of the brush down and into engagement with the grass of the green, and up, disengaging from contact with the grass, closely tracks the movement of the cutter head and the movement is smooth. Furthermore, the booms that are attached to the cutter head frame and behind the cutter heads and clippings buckets do not interfere with their normal operation, including removal of the buckets to dump the clippings.

Another important feature of the present invention is the lifting latch. This latch helps to secure the brush in the elevated position for longer times, rather than when simply making a turn at the end of a pass over the greens, such as when the mower is stored overnight and when being transported. The latch allows the user to decouple the lifting of the brush assembly from the lifting of the cutter head when desired.

Still another feature of the present invention is the fact that the casters supporting the brush on the grass are fully adjustable, so that the extent of the contact between the brushes and the grass is completely controllable by the user.

Another feature of the present invention is that the fibers of the brush are slightly stiffer than past brushes so that the fibers tend to walk on the grass, building up greater spring force to move through the grass blades.

These and other features and their advantages will be apparent to those skilled in the art of golf course mower design and operation from a careful reading of the Detailed Description of Preferred Embodiments accompanied by the following drawings.

BRIEF DESCRIPTION OF THE SEVERAL VIEWS OF THE DRAWINGS

In the drawings,

FIG. 4 is a top view of the brush attachment in the lowered position, with the lifting latch released, according to a preferred embodiment of the present invention;

FIG. 5 is a top view of the brush attachment in the elevated position with the lifting latch set, according to a preferred embodiment of the present invention; and FIGS. 6A–E show a sequence of views of the brush attachment moving from the lowered position, lifting latch released, to the elevated position, with the lifting latch set, according to a preferred embodiment of the present invention.

DETAILED DESCRIPTION OF THE INVENTION

The present invention is a brush attachment for a greens mower and a mower with a greens attachment. Terms used herein, such as distal and proximal, forward and rearward, are given from the perspective of a user sitting on the mower.

Figure 1:
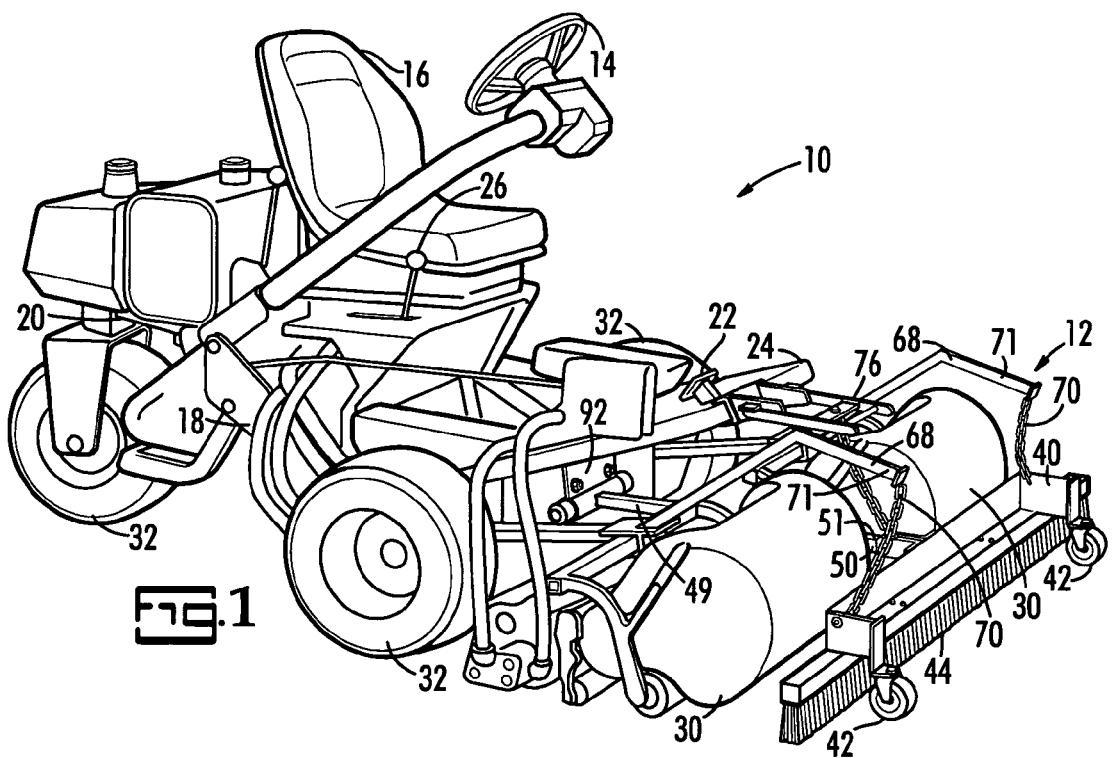
FIG. 1 is a perspective view of a mower with the present greens brush attachment in the down or lowered position, with the lifting latch released, according to a preferred embodiment of the present invention.
Figure 2:
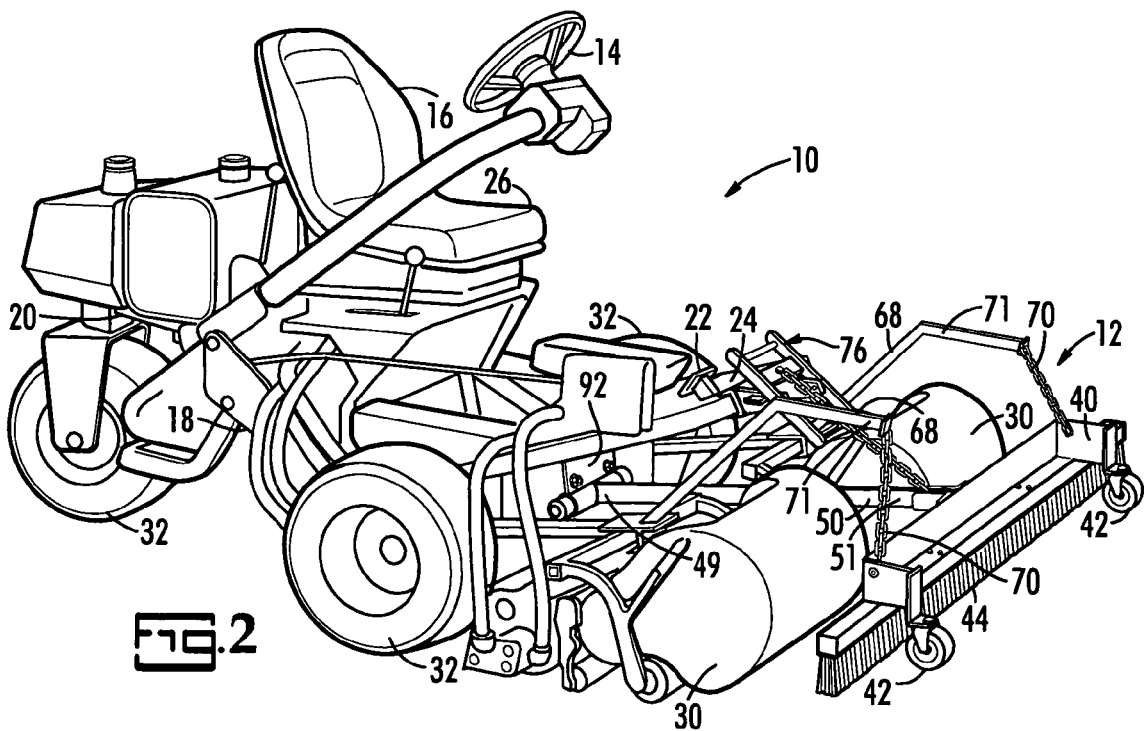
FIG. 2 is a perspective view of the mower of FIG. 1 with the present greens brush attachment in the up or elevated position, with the lifting latch set, according to a preferred embodiment of the present invention.

Referring now to FIGS. 1 and 2, there is illustrated a typical greens mower 10 with the present brush assembly 12 attached to it. Mower 10, by itself without brush assembly, is a prior art mower such as that manufactured by The Toro Company under the trademark GREENSMASTER, and has the usual features of such a mower, including a steering mechanism 14, a seat 16, a frame 18, an engine 20 with fuel supply, foot controls 22 on a foot plate 24, a gear shift 26, a pair of cutter heads 28, a corresponding pair of clippings buckets 30, wheels 32. These components cooperate to provide a greens mower in the same way as prior art greens mowers. The operator can, by suitable manipulation of cutter head controls (on the opposing side of that shown in FIGS. 1 and 2), raise and lower cutter heads 28 and clippings buckets 30 in the same manner as prior art mowers can. Cutter heads 28 are lowered when the user wants to clip the grass and raised when the user does not want to clip the grass. For example, when cutting the grass of a green, the user riding mower 10 will make a pass over the green with the cutter heads 28 lowered, cutting the grass as mower 10 moves, and then, at the verge of the green, raise cutter heads 28, make a 180° turn, and then make another pass over the green in a direction parallel to and on a course adjacent to the preceding pass. This process is repeated until all of the grass on the green has been cut. The present mower 10 is used in essentially the same manner as a prior art mower.

Figure 3:
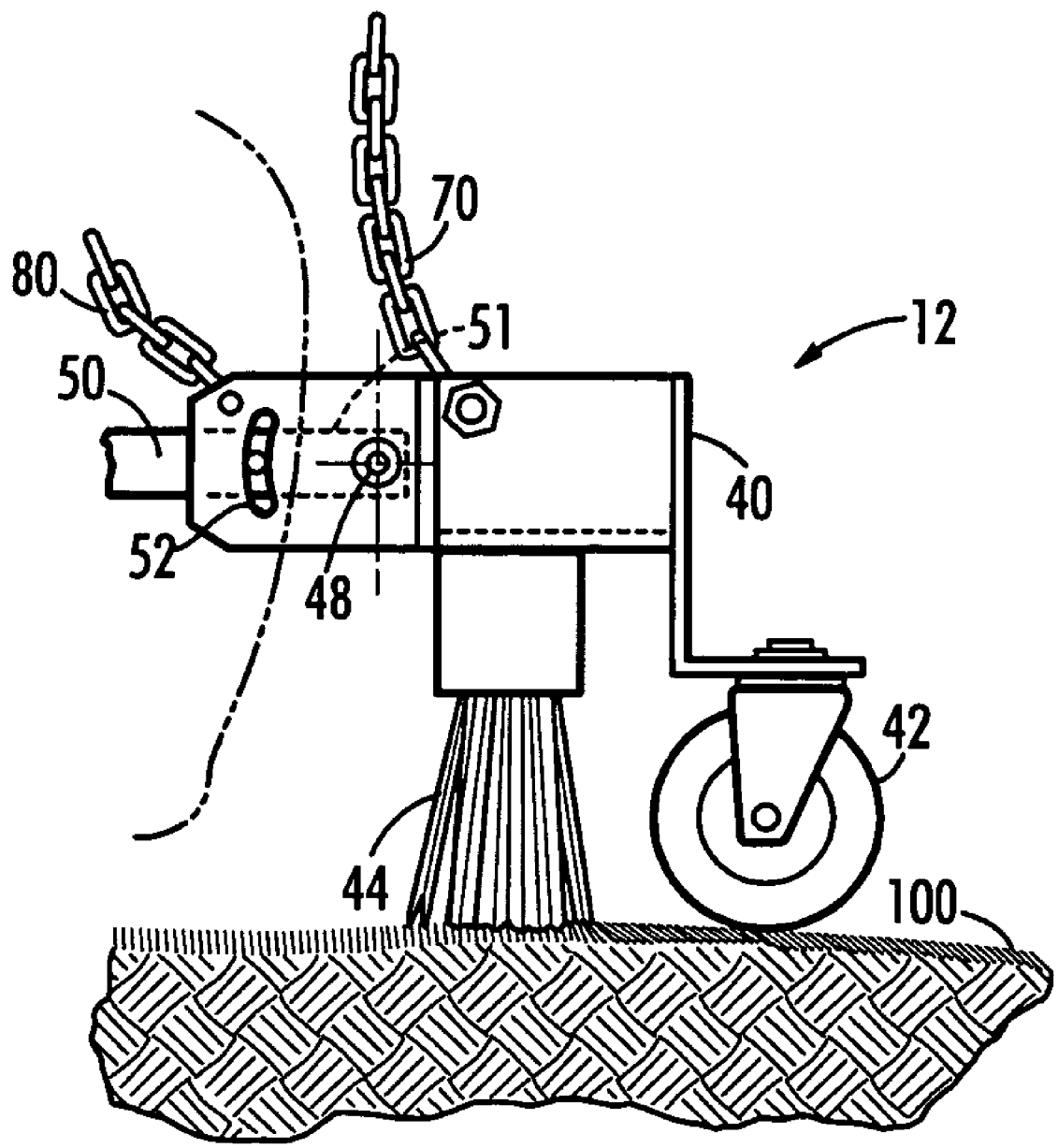
FIG. 3 is a side detailed view of the brush at its point of attachment, according to a preferred embodiment of the present invention.

The attachment of brush assembly 12 to mower 10 is an important aspect of the present invention. Brush assembly 12 includes a framework 40 that supports two casters 42 and brush 44. Casters 42 limit the depth of brush 12 into the grass by holding brush 12 at the proper height. Brush assembly 12 can be slightly lowered or raised with respect to the position of casters 42 by loosening a fastener 48 that connects framework 40 to lever arm 50, as best seen in FIG. 3. An arcuate slot 52 permits a limited range of motion of framework 40 about fastener 48, which defines as a pivot point for framework 40 to pivot about the distal end 51 of lever arm 50, until fastener 48 is fastened securely to hold framework 40 and brush 44 in position with respect to casters 42.

The fibers of the brush are slightly stiffer than past brushes, because of their slightly greater thickness, preferably $1/16^{th}$ inch in diameter, and made of a resilient polymeric material, so that the fibers tend to walk on the grass, building up greater spring force to move through the grass blades.

Frame 18 includes mower frame 60 and cutter head frame 62. The former supports engine 20, seat 16, steering mechanism 14 and foot plate 24 and is itself supported by wheels 32. The latter, cutter head frame 62, supports cutter heads 28 and clippings buckets 30. Hydraulic rams (not shown) raise and lower cutter head frame 62 with respect to mower frame 60, as in prior art mowers. Two booms 68 are firmly attached to cutter head frame 62, rearward of cutter heads 28 and buckets 30, and extend forward, over and beyond cutter heads 28 and clippings buckets 30 in order to provide support for brush assembly 12 forward of clippings buckets via chains 70. Booms 68 are high enough over cutter heads 28 and buckets 30 to not interfere with their operation and to allow clippings buckets 30 to be removed without removal of the booms 68. Preferably, chains 70, which run from the distal ends 71 of booms 68 to framework 40, as shown in FIG. 1, are dimensioned to be a little slack so that the weight of brush assembly 12 is born by casters 42. When the distal ends 71 of booms 68 are elevated by the upward movement of cutter head frame 62, the slack in chains 70 is taken up first and quickly, and then the pull on chains 70 elevates brush assembly 12, as shown in FIG. 2.

From inspection of the differences between FIGS. 1 and 2, it will be evident that a handle 76 of lifting latch 78 has been moved from a released position, as seen in FIG. 1, to a set position, as seen in FIG. 2. The operation of lifting latch 78 will be described in more detail below. Lifting latch 78 lifts brush assembly 78 independent of cutting head frame 62 when mower 10 is stored or when brushing is not desired. Lifting latch 78 is moved to the set position when it is desired that brush assembly 12 is to remain elevated and decoupled from the movement of cutter head frame 62, and is released when it may be lowered and once again coupled to the movement of cutter head frame 62.

FIGS. 4 and 5 illustrate top views of the forward portion of mower 10 and brush assembly 12. In FIG. 4, handle 76 of lifting latch 78 is forward in the released position, and, accordingly, brush assembly is in the lowered, grass-engaging position. Lifting latch 78 is connected, again preferably by a chain 80 to framework 40 so that when lifting latch is operated, chain 80 is either pulled or released. When chain 80 is released, brush assembly 12 is lowered; when chain assembly is pulled, brush assembly 12 is elevated. Lifting latch 78 operates brush assembly 12 independent of cutter head frame 62.

Handle 76 is a compound handle, with two parts, a first part 86 firmly attached to foot plate 24, and a second part 88 pivotally attached to first part 86 so that it is able to pivot about an axis parallel to brush 44 at the point of attachment to first part 86. Chain 80 is attached to second part 88. When second part 88 is pivoted rearward (toward seat 16) with respect to first part 86, it pulls chain 80 and thereby lifts brush assembly 12. When second part 88 is pivoted forward (away from seat 16), it releases chain 80 and allows brush assembly 12 to be lowered.

Note also from FIGS. 4 and 5 that the proximal end 49 of lever arm 50 connects brush assembly 12 to foot plate 24. A depending plate 92 is fastened rigidly to foot plate 24 and pivotally supports the proximal end 49 of lever arm 50. See also FIG. 6A.

FIGS. 6A–6E show the operation of brush assembly 12 and lifting latch 78 in a sequence beginning with brush assembly 12 in the lowered, grass engaging position and lifting latch 78 released. Subsequent figures illustrate the movement of the various components of brush assembly 12 and lifting latch 78 through to the elevated position of brush assembly 12 and set position of lifting latch 78. These various figures depict the forward part of mower from the right side and from front wheel 32 forward to brush 44.

Figure 6A:
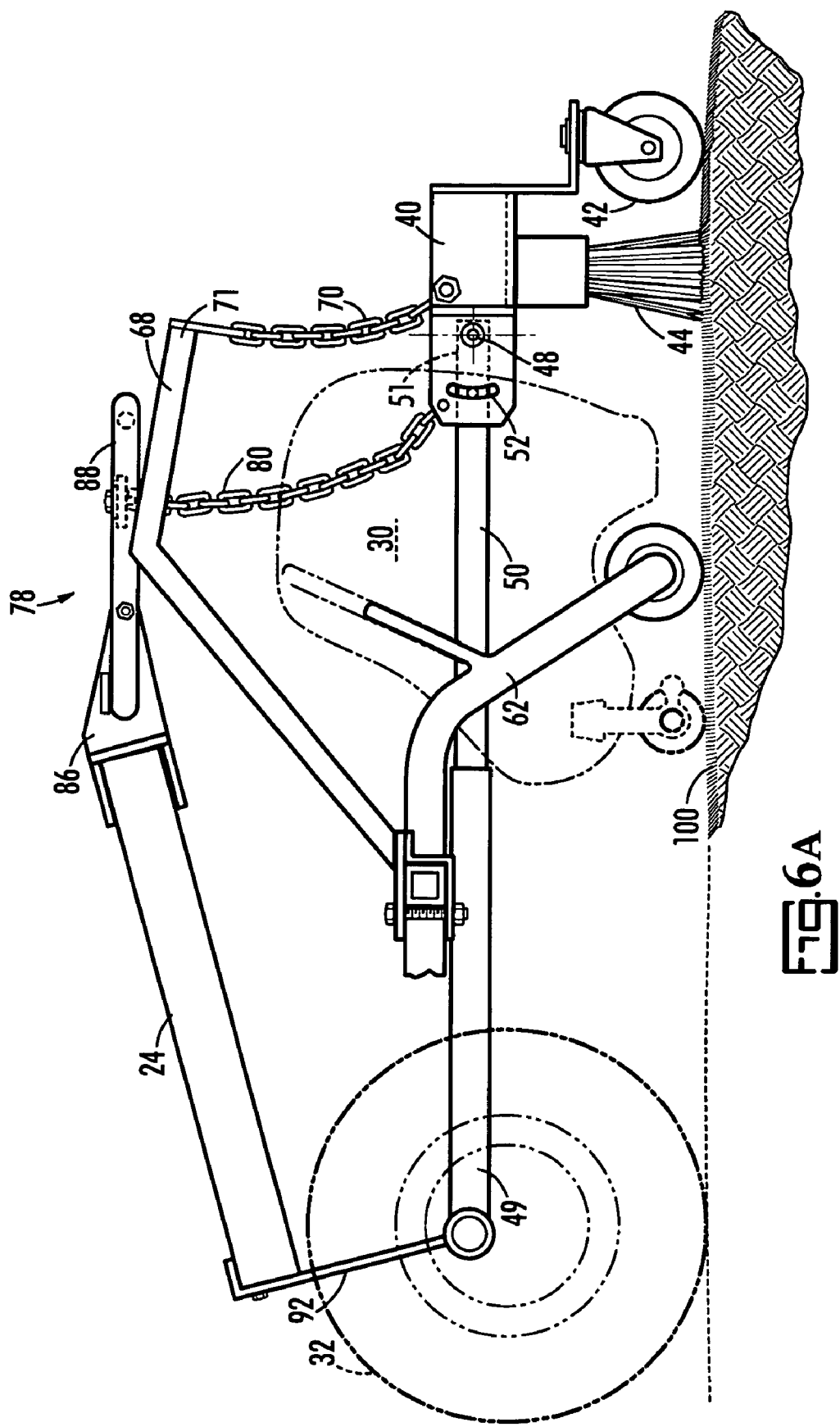

In FIG. 6A, brush 44 of brush assembly 12 is engaging the grass 100 in the lowered position. Cutter heads 28 and cuttings bucket 30 are also in the lowered position and lifting latch 78 is in the released position. Note that chains 70 and chain 80 are both slack.

Figure 6B:
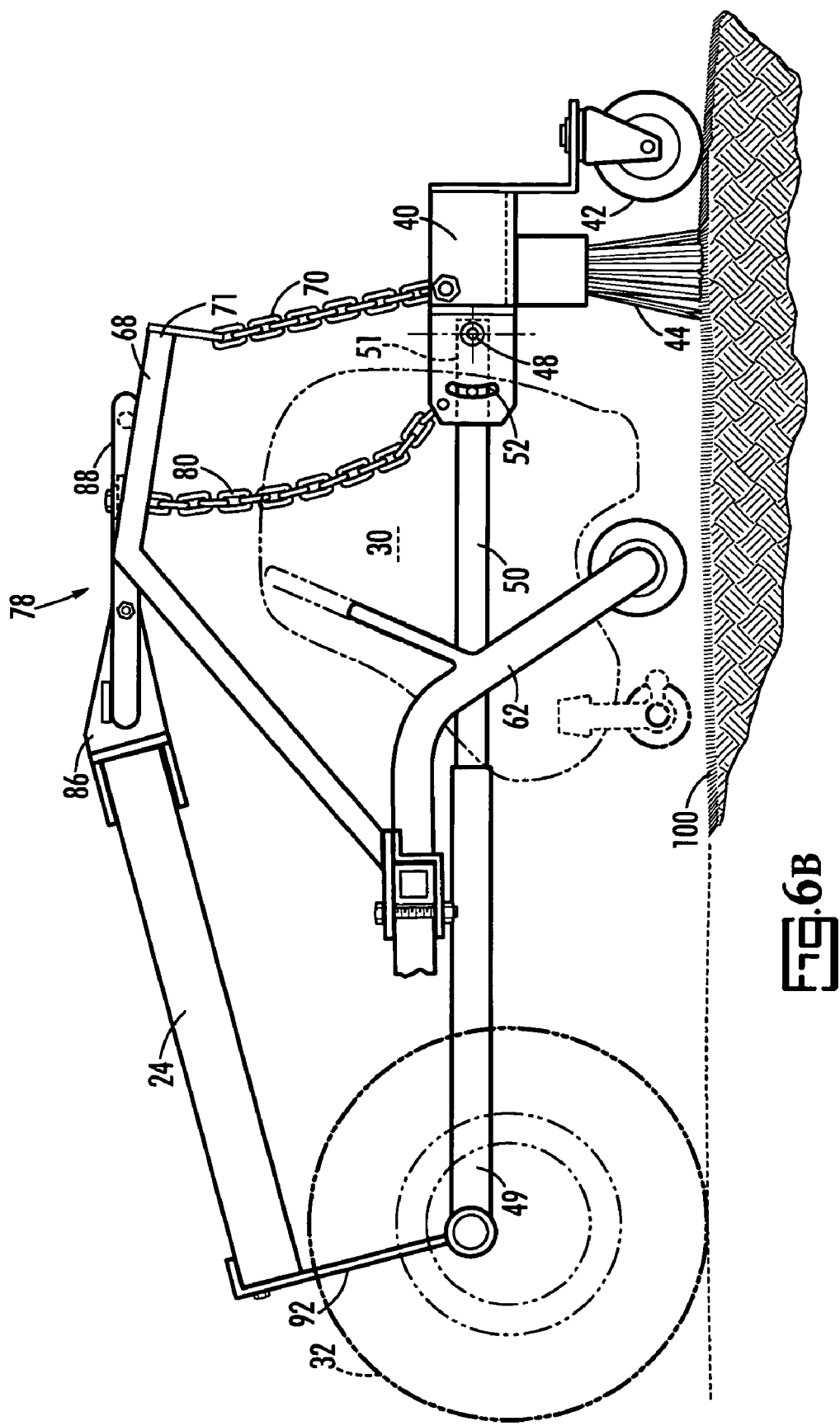

In FIG. 6B, cutter head frame 62, including cutter heads 28 and cuttings bucket 30, has been lifted from the lowered position slightly. Lifting cutter head frame 62 also lifts booms 68, as boom 68 is rigidly attached to cutter head frame 62, which in turn takes the slack out of chains 70, but thus far not enough to lift brush assembly 12.

In FIG. 6C, cutter head frame 62 has been lifted yet higher, further lifting booms 68. Now chains 70, attached to the distal ends 71 of booms 68, begin to lift brush assembly 12 from the grass-engaging position.

Figure 6D:
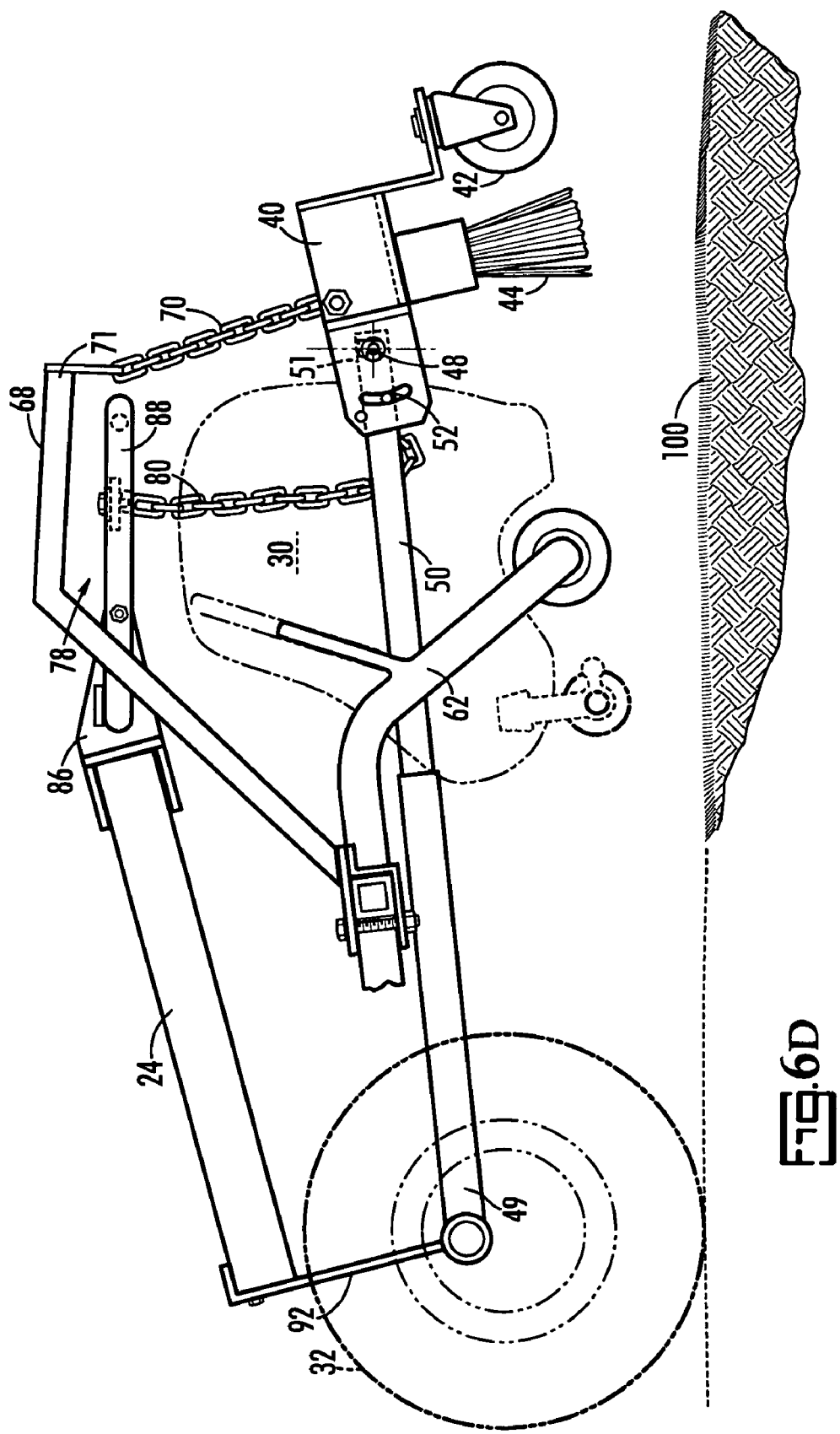

In FIG. 6D, cutter head frame 62 with cutter heads 28 and clippings buckets 30 are now in the (fully) elevated positions, booms 68 have also been moved to the elevated positions and, acting via chains 70, have elevated brush assembly 12.

Figure 6E:
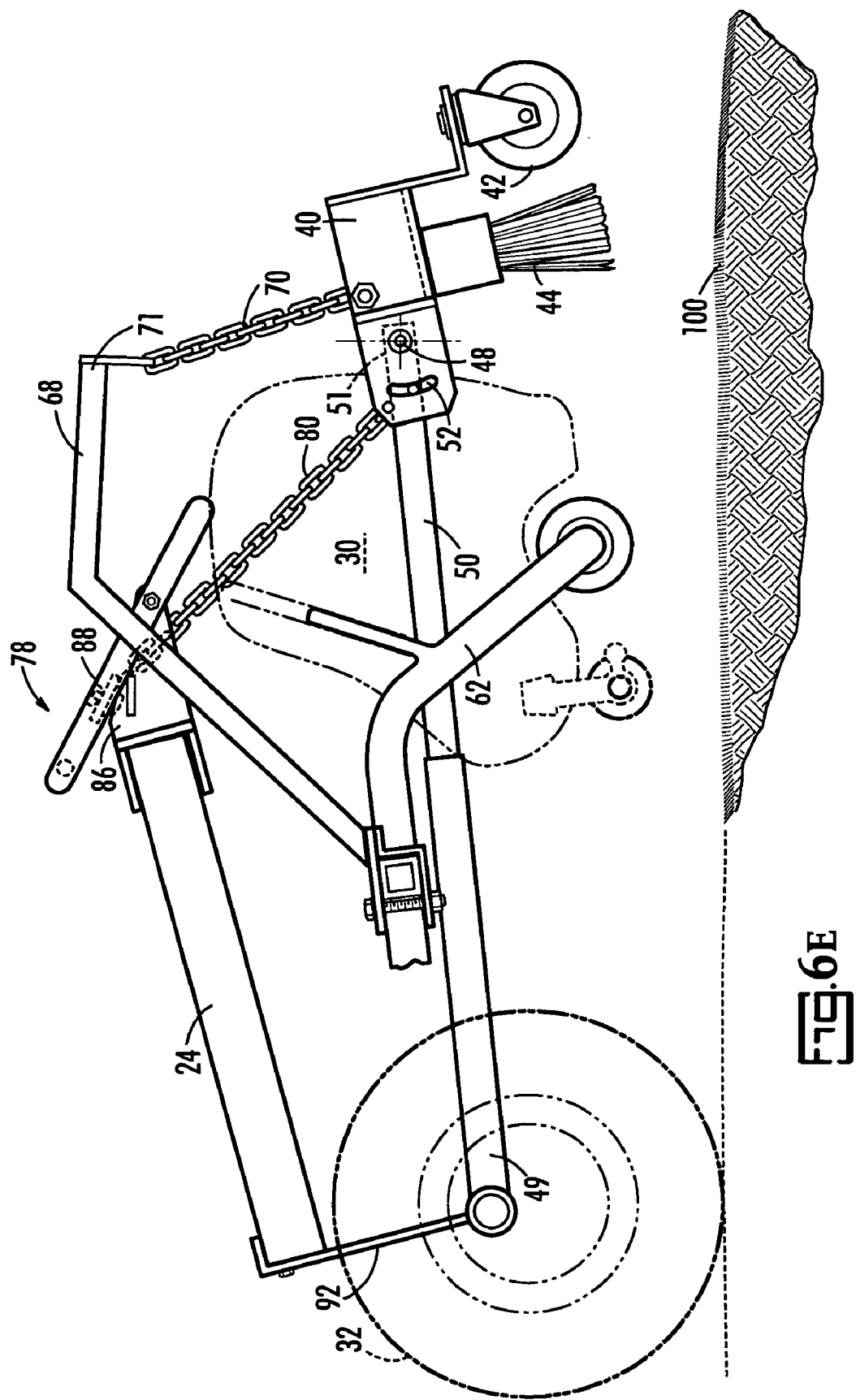

In FIG. 6E, cutter head frame 62 is still in the elevated position and still elevating brush assembly 12. However, lifting latch 78 has been set by pivoting first part 86 of lifting latch 78 rearward, thus taking the slack out of chain 80. Now, if cutter head frame 62 were lowered with lifting latch 62 in the set position as shown, booms 68 would also be lowered and chains 70 would become slack, but chain 80, connected to first part 86 of lifting latch 78 would remain taut and hold brush assembly 12 in the elevated position. Brush assembly 12 has been decoupled from the movement of cutter head frame 62 by setting lifting latch 78.

It is intended that the scope of the present invention include all modification that incorporates its principal design features, and that the scope and limitations of the present invention are to be determined by the scope of the appended claims and their equivalents. It also should be understood, therefore, that the inventive concepts herein described are interchangeable and/or they can be used together in still other permutations of the presents inventions, and that other modifications and substitutions will be apparent to those skilled in the art from the foregoing description of the preferred embodiments without departing from the spirit or scope of the present invention.

What is claimed is:

1. A greens brush assembly for use with a golf course greens mower, said greens mower having a cutter head frame and means for lowering said cutter head frame to a grass-engaging position and elevating said cutter head frame from said grass-engaging position, said greens brush assembly comprising:
   a lever arm having a proximal end and a distal end, said proximal end being adapted to pivotally attach to a greens mower;
   a framework attached to said distal end of said lever arm;
   a greens brush attached to said framework;
   at least one boom having a proximal end and a distal end, said proximal end being attached to said cutter head frame carried by said mower and said distal end extending over and forward of said cutter head frame and spaced apart therefrom so that said cutter head frame lifts said at least one boom when said cutter head frame is lifted and lowers said at least one boom when said cutter head frame is lowered; and
   means for connecting said distal end of said at least one boom to said framework so that, when said at least one boom is elevated, said framework and said greens brush are elevated, and, when said at least one boom is lowered, said framework is lowered and said greens brush is brought to said grass-engaging position.

2. The greens brush assembly as recited in claim 1, wherein said connecting means is a chain.

3. The greens brush assembly as recited in claim 1, further comprising a lifting latch having a set position, wherein said framework and greens brush are disconnected from said cutter head frame, and a released position, wherein said framework and greens brush are connected to said cutter head frame.

4. The greens brush assembly as recited in claim 3, wherein said lifting latch has a first part and a second part, said first part being attached to said mower and said second part being pivotally attached to said first part so that said second part rotates toward and away from said mower.

5. The greens brush assembly as recited in claim 3, further comprising a chain connecting said lifting latch to said framework.

6. The greens brush assembly as recited in claim 4, further comprising a chain connecting said second part to said framework so that, when said second part is rotated toward said mower, said chain pulls said framework into said elevated position.

7. The greens brush assembly as recited in claim 1, wherein said framework is pivotally mounted to said distal end of said lever arm.

8. The greens brush assembly as recited in claim 4, further comprising a fastener and wherein said distal end of said lever arm has an arcuate hole formed therein and said fastener fastens said framework to said distal end of said lever arm so that said framework is fastened using said fastener at any angle permitted by said arcuate hole.

9. A greens mower, comprising:
   a frame including a mower frame and a cutter head frame, said cutter head frame being pivotally attached to said mower frame;
   an engine carried by said mower frame;
   wheels in operative connection with said engine and supporting said mower frame;
   a cutter head carried by said cutter head frame and pivotal with said cutter head frame;
   means for pivoting said cutter head frame with respect to said mower frame;
   a lever arm having a proximal end pivotally attached to said mower frame and an opposing distal end;
   a boom having a proximal end attached to said cutter head frame and an opposing distal end extending over and beyond said cutter head;
   a framework attached to said distal end of said lever arm;
   a greens brush carried by said framework; and
   means connecting said distal end of said boom to said framework for lifting said framework and said greens brush from a lowered, grass-engaging position to an elevated position, said lifting means coupling brush said distal ends of said boom to said framework so that when said boom is lifted by said cutter head frame, said framework with said greens brush is lifted.

10. The mower as recited in claim 9, further comprising a lifting latch carried by said mower frame and connected to said framework for disconnecting said greens brush and said cutter head frame.

11. The mower as recited in claim 10, wherein said lifting latch has a first part and a second part, said second part being pivotally attached to said second part so that said second part can be rotated toward said mower.

12. The mower as recited in claim 11, further comprising a chain connecting said second part to said framework.

13. The mower as recited in claim 9, wherein said lifting means is at least one chain.

14. The mower as recited in claim 9, further comprising a clippings bucket carried by said cutter head frame, and wherein said boom extends over said clippings bucket high enough so that said clippings bucket can be removed without removing said boom.

15. The mower as recited in claim 9, further comprising a clippings bucket carried by said cutter head frame, and wherein said boom is attached to said cutter head frame rearward of said clippings bucket and said cutter head.

* * * * *